United States Patent [19]

Kumpf

[11] Patent Number: 4,793,594

[45] Date of Patent: Dec. 27, 1988

[54] APPARATUS FOR SUBSEQUENT INSERTION OF CABLES IN DUCTS PROVIDED FOR THIS PURPOSE

[75] Inventor: Erich Kumpf, Esslingen, Fed. Rep. of Germany

[73] Assignee: Ursula Kumpf, Esslingen, Fed. Rep. of Germany

[21] Appl. No.: 55,626

[22] PCT Filed: Sep. 13, 1985

[86] PCT No.: PCT/DE85/00319
§ 371 Date: May 13, 1987
§ 102(e) Date: May 13, 1987

[87] PCT Pub. No.: WO87/01878
PCT Pub. Date: Mar. 26, 1987

[51] Int. Cl.$^4$ ............................................ B65H 59/00
[52] U.S. Cl. ........................................ 254/134.3 FT
[58] Field of Search ............... 254/134.3 FT, 134.3 R, 254/134.4; 15/104.35 N

[56] References Cited

FOREIGN PATENT DOCUMENTS 3231027 3/1983 Fed. Rep. of Germany .
3427788 2/1986 Fed. Rep. of Germany .

Primary Examiner—Robert C. Watson
Attorney, Agent, or Firm—Jones, Tullar & Cooper

[57] ABSTRACT

An apparatus (11) is described for the subsequent insertion of cables into ducts (14) provided for this purpose and already equipped with at least one cable. The apparatus (11) has an intermediate bottom (12) which is insertable into the duct (14) and is provided on both sides with a hollow bead-like longitudinal rim (18, 19), as a height guide, and on the front with a rotatable roller (26), as a cable guide.

To enable simple insertion of the intermediate bottom (12) even in cable ducts (14) laid with relatively short radii of curvature, using an apparatus (11) of this kind, the bead-like longitudinal rims (18, 19) are provided with a hollow space (12) of circular cross section and with a slit (22) at one point on their circumference and extending over their entire length.

7 Claims, 2 Drawing Sheets

APPARATUS FOR SUBSEQUENT INSERTION OF CABLES IN DUCTS PROVIDED FOR THIS PURPOSE

BACKGROUND OF THE INVENTION

The present invention relates to an apparatus for subsequent insertion of cables in ducts provided for this purpose, as defined by the preamble to claim 1.

In an apparatus of this kind known from German Pat. No. 32 31 027, the intermediate bottom provided with the bead-like longitudinal rims is relatively rigid, so that when it is inserted into relatively long cable ducts laid with relatively short radii, problems may arise because the friction between the inner wall of the duct and the intermediate bottom becomes very great, thus necessitating excessive forces for insertion of the intermediate bottom.

SUMMARY OF THE INVENTION

It is the object of the present invention to provide an apparatus for the subsequent insertion of cables in ducts provided for this purpose as generically defined above, with which the intermediate bottom can be inserted In a simple manner, even with cable ducts laid with relatively short radii of curvature.

In an apparatus for the subsequent insertion of cables into ducts provided for this purpose as generically defined above, this object is attained by providing an intermediate bottom capable of being drawn into the duct, which is provided on both sides with a hollow bead-like longitudinal rim as a height guide and on its front with a cable guide, the rims being slit in the longitudinal direction.

By slitting the bead-like longitudinal rims, the torsional rigidity of the intermediate bottom is reduced substantially, so that during insertion into the cable duct the intermediate bottom can follow along the duct windings without a substantial increase in the force of friction between the duct inner wall and the edges of the intermediate bottom, even if the windings have a relatively short radius. This means that the force required for insertion of the intermediate bottom practically does not increase, even if relatively long cable ducts are laid with relatively short radii of curvature.

A further reduction in the torsional rigidity of the intermediate bottom is achieved in accordance with a preferred exemplary embodiment by providing the bead-like longitudinal rims with a hollow space of circular cross section and with a slit at one point on its circumference extending over its entire length. This also provides the further advantage that the provision of the slit can be done in a simple manner when the intermediate bottom is manufactured.

Suitably, the slit of one rim is provided in an upper circumferential region, and the slit of the other rim is provided in a lower circumferential region, that is, at circumferential regions remote from one another. Advantageously, the slits sever the wall of the hollow bead-like rim at an angle of preferably approximately 60°, so that in the closed state the rims overlap in the vicinity of the slits.

According to a further embodiment of the present invention, a cable is insertable into the circular hollow bead-like rim, Which can be done either prior t the insertion of the intermediate bottom or afterward with the aid of a tension cable or the like.

In the above-mentioned known apparatus, a roller toward the front end is provided with a hollow throat extending continuously around it over the entire length, which may present problems in moving over the already-laid cable or cables. According to a further exemplary embodiment of the present invention, the front roller is therefore embodied as barrel-shaped, so that the already laid cables can be distributed toward the outside as needed by the roller; this is more advantageous than in the case of the known roller, in which these cables tend instead to be forced inward Further details of the invention are included in the ensuing description, in which the invention is described in further detail in terms of the exemplary embodiment shown in the drawing. Shown are:

DESCRIPTION OF THE PREFERRED EMBODIMENT

Figure 1:
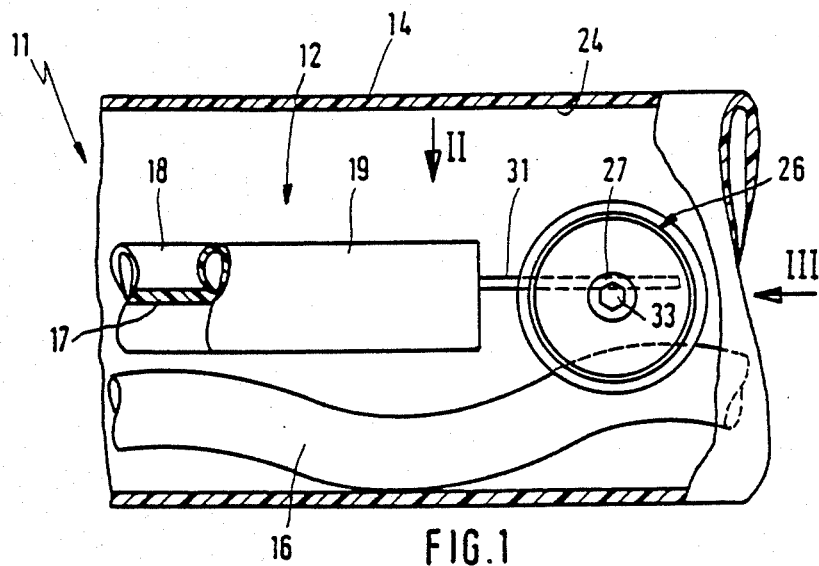
FIG. 1 illustrates in a partially cut-away side view, an apparatus for the subsequent laying of a cable in a cable duct, in accordance with a preferred exemplary embodiment of the present invention.
Figure 2:
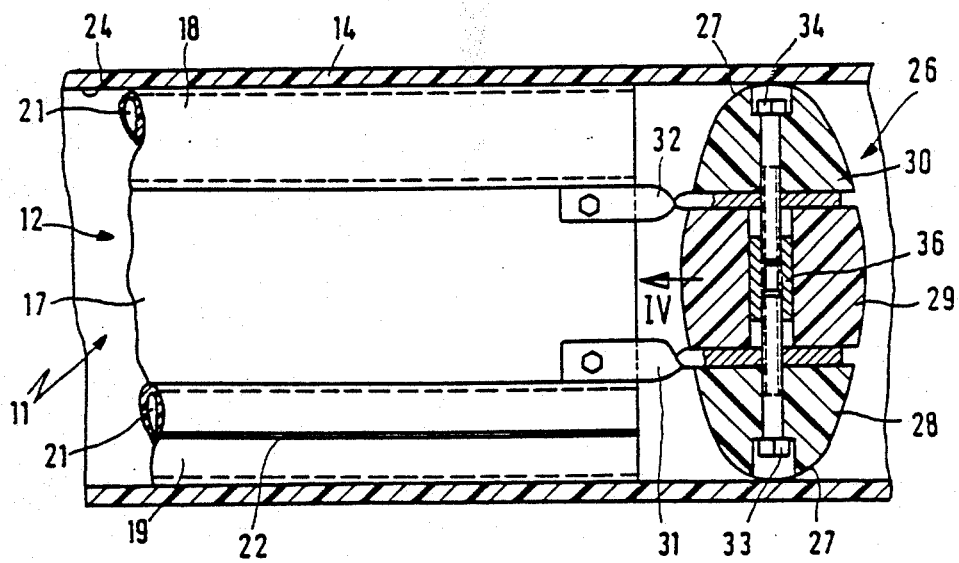
FIG. 2, is a plan view of the apparatus according to the invention in the direction of arrow II of FIG. 1.

The apparatus 11 according to the invention is used for preparation of the subsequent insertion, or for the subsequent insertion, or for laying of one or more additional electrical and/or optical cables 13, 13', 13'' into a cable duct 14 provided for this purpose and made of plastic, which is laid in the soil and already holds one electrical cable 16 that rests on the bottom in the duct. The duct 14, typically composed of a plurality of sections, extends between two ascending shafts, Is typically used in the laying of telephone cables, for instance, and is substantially larger in terms of its diameter than the cable 16 itself, so that sufficient space would still be available inside the duct 14 for laying or inserting additional cables. The apparatus 11 utilizes an intermediate bottom 12 for this purpose, which is inserted subsequently the already-laid duct 14.

The intermediate bottom 12, which serves the purpose of three-dimensional separation add optionally electrical isolation as well of the already laid cable 16 on the one hand and of the cable or cables 13, 13', 13'' laid subsequently, is manufactured for instance from a plastic that is rigid in the crosswise direction, such as polyamide, polyester, hard PVC or the like.

The intermediate bottom 12 is in one piece, being extruded, for example, and has a strip-like middle region 17, the two longitudinal edges of which are each adjoined by a respective bead 18 and 19, which over their entire length each have a hollow space 21 of circular cross section. Each bead 18, 19, which is thus embodied hollow-cylindrically in the manner of a tube, is provided at one point on its circumference with a cut or slit 22 penetrating the wall, which is embodied or arranged in such a manner that the associated cut faces rest directly against one another or without a substantial spacing between them. The cut 22 in the bead 18 is disposed on an upper circumferential region, and the cut 22 in the bead 19 is disposed on a lower circumferential region, in each case preferably in the vicinity of the center vertical. The two cuts or slits 22 thus disposed on sides remote from one another of the bead 18 and 19, respectively, extend at an angle of preferably approximately 60° with respect to the center vertical, in such a manner that they extend obliquely from the outside toward the center region 17, so that the cut faces overlap or cover one another. By the disposition of such continuous slits 22, the intermediate bottom 12 is made less torsionally rigid. In the longitudinal direction, the intermediate bottom 12 is preferably embodied as flexible such that it can be wound up, or in other words unwound from a roll, so that once the process of insertion into a cable duct 14 has been completed it can be suitably cut off.

As the figures show, the outer width of the intermediate bottom 12 is at most equal to or somewhat less than the inside diameter of the already laid cable duct 14, so that the beads 18, 19 at the same time form the height guide for the intermediate bottom 12 during the insertion into the duct 14. The inside diameter of the hollow beads 18 and 19, which preferably have the same diameter, is large enough to also receive a further cable, for instance in the form of a relatively thin optical cable 13' (see FIG. 3). A cable 13' of this kind can either already be laid in the intermediate bottom 12 to be inserted, or can be inserted subsequently by means of an already-inserted tension wire.

The apparatus 11 according to the invention, in the exemplary embodiment shown, has in addition to the intermediate bottom 12 a cable guide in the form of a substantially approximately barrel-shaped roller 26. This roller 26 has rounded ends 27, the radius of curvature of which is preferably greater than the outside radius of the beads 18, 19 of the intermediate bottom 12, and with a symmetrical barrel shape has a maximum longitudinal center diameter which is greater than the outside diameter of the bead 18, 19. The width of the roller 26 is at most equal to or somewhat smaller than the inside diameter of the laid cable duct 14, so that the roller 26 can in addition to its function as a cable guide also serve as a height guide. The roller 26 comprises three parts, namely two identical outer parts 28 and 30 and a middle part 29, which together form the aforementioned barrel shape. Disposed between the parts 28-30 are two brackets 31, which at a circumferential region protrude beyond the roller 26 and are releasably secured to the middle region 17 of the intermediate bottom 12. The roller parts 28-30 and the brackets 31, 32 disposed between them are held together by means of two axial screws 33, 34 and a central threaded sleeve 36, the latter being held unrotatably in the middle part 29. The two screws 33 and 34 are inserted axially into corresponding bores in the end parts 28 and 30 and are secured in the threaded sleeve 36, so that aside from the two gaps, the barrel shape of the roller 26 is brought about. The roller 26 is manufactured for instance from a plastic; the brackets 31, 32 are preferably of metal. The roller 26 is held on the brackets 31, 32 in such a manner that the roller parts 28-30 can easily rotate about their axis of rotation.

The subsequent insertion of the intermediate bottom into an already-laid cable duct 14 is effected in that the intermediate bottom 12, provided on its front end with the roller 26, is inserted with the aid of a drive device, not shown, wherein the roller 26 rolls along the inner wall 24 of the duct and rolls over the already-laid cable 16 and thereby presses the laid cable 16 to one or the other side in the direction of the bottom of the duct, or gets out of its way by assuming an oblique position. Correspondingly, the intermediate bottom 12 moves inside the duct 14; that is, it slides along the inner wall 24 of the duct and becomes twisted in accordance with the varying location of the roller 26. It does not matter whether the roller 26 or the intermediate bottom 12 is disposed extending exactly horizontally, as shown in the drawing, or obliquely in one or the other direction, or in other words is inclined inside the duct 14, because in this context the term "intermediate bottom" also encompasses the term "intermediate wall", if in the extreme case the roller 26 and/or the intermediate bottom 12 should assume an oblique or vertical position. This position is determined by the location of the already laid cable 16 in the duct 14, because the intermediate bottom 12 is capable of twisting.

Figure 3:
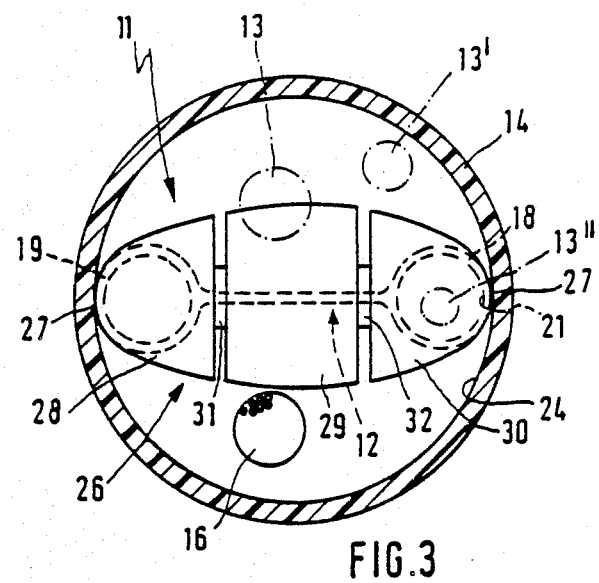
FIG. 3 is a front view of the apparatus according to the invention in the direction of arrow III of FIG. 1, and FIG. 4, is a front view of the intermediate bottom of the apparatus according to the invention in the direction of the arrow IV of FIG. 2.
Figure 4:
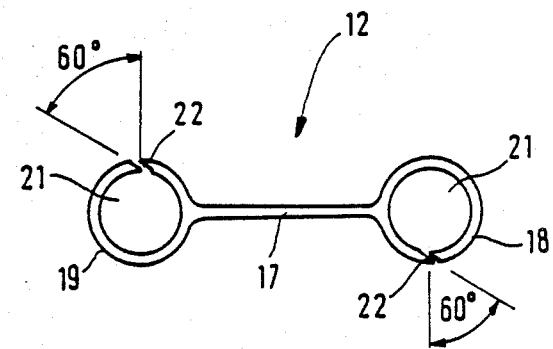

The cable or cables 13, 13' to be laid subsequently over or on the intermediate bottom 12 as shown by dot-dash lines in FIG. 3 are either drawn in with the aid of a tension cable after the insertion of the intermediate bottom 12, or by being secured to the front end of the intermediate bottom are laid simultaneously with the insertion of the intermediate bottom 12.

In accordance with additional exemplary embodiments of the present invention, not shown in the drawing, the slits or cuts 22 in the beads 18, 19 of the intermediate bottom 12 may also be provided in such a manner that they extend not over the entire length but rather in segments over a certain length, at the same points or at different points. It is also possible, instead of the overlapping disposition of the cut limiting faces shown, for the cut to be made in the aforementioned center plane, or in other words at right angles to the strip-like center region 17.

I claim:

1. An apparatus for the subsequent insertion of at least one cable in a duct having at least one cable therein, comprising:
    intermediate bottom means capable of being drawn into the duct, said intermediate bottom means having two side portions, a middle portion, and a front portion connected to each other with a height guide in the form of a hollow bead-like longitudinal rim situated along each of the two side portions, each rim being slit in the longitudinal direction; and
    a cable guide connected to the front portion of the intermediate bottom means.

2. The apparatus as defined in claim 1, wherein each rim includes a hollow space of circular cross sections, and wherein the slit in each rim is situated at a given location on the circumference of the rim and extends over the entire longitudinal length of the rim.

3. The apparatus as defined in claim 2, further wherein the slit in one rim is situated at an upper circumferential region of the rim and the slit in the other rim is situated at a lower circumferential region of the rim.

4. The apparatus as defined in claim 1, wherein each slit is formed as a passage through the wall of its respective rim, whereby the passage defined by each slit it situated at an angle of approximately 60° to the vertical.

5. The apparatus as defined in claim 2, further wherein the hollow space in each rim is dimensioned to receive a cable drawn therethrough.

6. The apparatus as defined in claim 1, wherein said cable guide comprises a roller having a barrel-shape.

7. The apparatus as defined in claim 6, further wherein said roller includes plural roller parts and at least one holder situated between the roller parts and connecting the roller parts to the front portion of the intermediate bottom means.

* * * * *